United States Patent [19]

Krude

[11] Patent Number: 4,632,203

[45] Date of Patent: Dec. 30, 1986

[54] INDEPENDENT WHEEL SUSPENSION SYSTEM USING THRUST BEARING CONSTANT VELOCITY UNIVERSAL DRIVE JOINTS AS SUSPENSION MEMBERS TO MINIMIZE WHEEL CAMBER

[75] Inventor: Werner Krude, Grosse Pointe Park, Mich.

[73] Assignee: GKN Automotive Components Inc., Southfield, Mich.

[21] Appl. No.: 586,011

[22] Filed: Mar. 5, 1984

[51] Int. Cl.$^4$ .............................................. B60K 20/00
[52] U.S. Cl. ..................................... 180/73.3; 280/690
[58] Field of Search ............................. 180/73.3, 73.4; 280/690, 700, 701

[56] References Cited

U.S. PATENT DOCUMENTS

| | | | |
|---|---|---|---|
| 2,942,678 | 6/1960 | Uhlenhaut et al. | 180/73.3 |
| 3,195,670 | 7/1965 | Dunn | 280/700 X |
| 3,952,824 | 4/1976 | Matschinsky | 180/73.3 |
| 4,081,049 | 3/1978 | Youmans | 180/73.3 X |
| 4,421,332 | 12/1983 | Kosak et al. | 280/690 |

FOREIGN PATENT DOCUMENTS 822497 10/1959 United Kingdom ............... 180/73.3

Primary Examiner—William R. Cline
Assistant Examiner—Peggy A. Neils
Attorney, Agent, or Firm—Remy J. VanOphem

[57] ABSTRACT

An independent wheel suspension system having an angle of at least five degrees between a wheel axis and a drive axis, the drive axis being established by a drive shaft coupling an outboard constant velocity joint within a wheel assembly with an inboard constant velocity universal joint within a differential housing, the independent wheel suspension system also has a swing arm coupling the wheel assembly to the vehicle frame and an angle of less than thirty degrees between the wheel axis and a swing axis, the swing axis being established through the center of the inboard constant velocity universal joint and a single pivot member coupling the swing arm to a transverse frame member of a vehicle frame.

7 Claims, 3 Drawing Figures

INDEPENDENT WHEEL SUSPENSION SYSTEM USING THRUST BEARING CONSTANT VELOCITY UNIVERSAL DRIVE JOINTS AS SUSPENSION MEMBERS TO MINIMIZE WHEEL CAMBER

BACKGROUND OF THE PRESENT INVENTION

Cross-Reference to Related Applications

This patent application is related to the following copending applications assigned to the common assignee hereof:

U.S. Ser. No. 586,086, filed Mar. 5, 1984, entitled "Independent Wheel Suspension System Using Thrust Bearing Constant Velocity Universal Drive Joints As Suspension Members";

U.S. Ser. No. 586,012, filed Mar. 5, 1984, entitled "Independent Wheel Suspension System Using Thrust Bearing Constant Velocity Universal Drive Joints, Bending and Torsional Motion Resistance Suspension Members And A Transversely Pivotable Differential";

U.S. Ser. No. 586,056, filed Mar. 5, 1984 entitled "Independent Wheel Suspension System Using Thrust Bearing Constant Velocity Universal Drive Joints As Suspension Members In Combination With A Single Prop Shaft Joint and A Transversely Pivotable Differential";

U.S. Ser. No. 586,022, filed Mar. 5, 1984 entitled "Independent Wheel Suspension System Using Constant Velocity Universal Joints In Combination With A Single Prop Shaft Joint And Mounted Differentials"; and U.S. Ser. No. 586,098, filed Mar. 5, 1984 entitled "Independent Wheel Suspension Using Thrust Bearing Constant Velocity Universal Drive Joints As Suspension Members in Combination With A Wheel Assembly And Differential Coupled To Pivot About A Transverse Stabilizer"; and U.S. Ser. No. 586,054, filed Mar. 5, 1984 entitled "Independent Wheel Suspension System Having A Differential Pivotable About Two Axes".

1. Field of the Invention

The present invention pertains to independent wheel suspension systems and, more particularly, to independent wheel suspension systems wherein constant velocity joints are used as a wheel suspension member to carry thrust loads.

2. Description of the Prior Art

The present invention has particular application to both front and rear wheel independent suspension systems wherein universal joints are used to transfer power from a power delivery unit, normally including an engine, transmission, and a differential housing, through half-shaft drive axles to the driving wheels. As a vehicle moves along a road surface, the wheels naturally experience an up and down movement relative to the driving surface. This movement is referred to as jounce and rebound, and the road clearance of various vehicle components vary accordingly. If the wheels are allowed to move in a plane approximately normal to the driving surface, such up and down movements have heretofore required corresponding changes in the swing length between the wheel and the differential of the power delivery unit. Such changes in swing length are normally effected by allowing an axial adjustment either of a driving member relative to the wheels or of one member of a driving member relative to another. Because of the dynamic loads associated with these up and down movements of the wheel and the geometric movements of the suspension members as a result of the various load and road conditions experienced by the wheels of a vehicle, past suspension system design efforts have taken the approach of completely isolating the drive system components from the suspension system components to prevent the application of suspension loads to the power delivery unit or torque translating drive components of a vehicle. As a result of this approach the structural design criteria of prior art vehicles is to limit the torque translating components of a vehicle to carry only torque loads to propel the vehicle and to design a separate suspension system to carry the loads associated with the up and down movement of the vehicle wheels as a result of load and/or road variations.

Independent wheel suspension systems generally contemplate the use of two general types of universal driving joints: the Cardan-type joint and the constant velocity type joint. The Cardan-type joint consists of two yokes connected by a plain or rolling type bearing on the ends of a Cardan or cruciform-shaped cross. The cross consists of a block and two pins, one pin being smaller than the other and passing through it. Even though heat-treated alloy steels are used throughout, the small pin diameters limit the capacity of the joint to carry axial thrust loads, such axial thrust loads normally impose stresses on the pins which are multiples of the stresses associated with carrying normal driving torque. Moreover, the stresses augment each other deleteriously, through vector addition. But the major deterrent to using a single Cardan-type joint in an independent rear suspension system is the severe limitation on the allowable angle of articulation under high torque loads. This is because the velocity ratio of the speed of the driving to the driven shaft pulsates or "knuckles" with increasing amplitudes as the angular articulation between these shafts increases. The cyclic speed pulsations significantly increase as articulation between the driving and driven joint members increase. Such speed pulsations cause correspondingly higher dynamic stresses on the Cardan cross pins and corresponding vehicle vibration and noise as loads of any appreciable inertia are translated through the joint. The higher dynamic stresses wear the joint structure to degeneratively further increase the speed variations and further limit the ability of the Cardan joint to carry high torque loads. Moreover, under thrust loads, the normal manufacturing tolerance of a Hooke's joint or Cardan joint, by themselves, cause unacceptable vibrations.

To avoid the foregoing deleterious stress and load carrying consequences of Cardan-type universal joints, their use in vehicles is generally limited to applications where the normal angular articulation between the driving and driven members is substantially less than ten degrees, usually less than three degrees.

Constant velocity universal joints have heretofore been used with independent wheel suspension systems to avoid the debilitating effects of the foregoing cyclic speed variations of Cardan-type joints while permitting substantially greater articulation angles of the wheel with respect to the drive shaft or the drive shaft with respect to the differential of the power delivery unit. Constant velocity universal joints of the type that provide uniform velocity between the driving and driven members at any intersecting angle of the joint are shown in U.S. Pat. No. 2,046,584 to Rzeppa, U.S. Pat.

No. 3,162,026 to Ritsema, and also commonly assigned U.S. Pat. Nos. 3,688,521, 3,928,985, 4,240,680 and 4,231,233, the specifications of which are hereby incorporated by reference. Such known constant velocity universal joints have heretofore been used to carry the driving torque transmitted through the spherical ball members of the joint. These balls ride in sets of opposing axial grooves formed on a partially-spherical inner joint member and on a partially-spherical outer joint member. A ball guide cage is positioned to capture and guide the balls through a homokinetic plane or rotation wherein the centers of the balls very nearly bisect the articulation angle between the driving and driven shafts resulting in a constant velocity transmission of rotary motion. The ball cage normally consists of upper and lower partially-spherical surfaces guided, respectively, on the partially-spherical inner and outer surfaces of the joint members but are designed to have radial clearances therebetween in order to insure lubrication of the surfaces and thereby avoid excessive heat build up.

In any event, the balls and axial grooves of the constant velocity universal joint have heretofore been used to translate the driving torque while the spherical portions of the inner and outer joint members experience the internally generated loads, such internally generated loads being carried either by direct contact between the inner and outer joint members or through the interposed spherical surfaces of the cage. As taught in U.S. Pat. No. 3,789,626, to Girguis, where one constant velocity universal joint was used as a fixed joint, as in the drive shaft of a rear drive motor vehicle, an object of such an application is to maintain the joint elements free of axial internal forces, even though the joint was constructed to absorb forces, at least those related to torque translation. In fact, the joint was designed to avoid transmitting axial forces through the control element. Therefore, when used at opposite ends of a driving half-shaft, one of such constant velocity universal joints has heretofore been of the axial slip or plunging variety, allowing axial movement of the driven joint with respect to the driving joint, and the constant velocity universal joint at the other end has been of the non-axial slip or fixed type not permitting such axial movement.

It is also known that, to obtain proper steering characteristics, the camber of the wheel, or the angle that a longitudinal plane therethrough makes with the axis, as viewed from the front or rear of the vehicle, must be maintained within predetermined limits in order to afford the desired handling and steering characteristics. However, as the independent wheel suspension causes the wheel to move about a swing axis having a pivot at the side of the differential, the wheel camber changes by an amount varying with the swinging movement of the wheel. To minimize the resulting change of camber, various structures have heretofore been provided to lengthen the effective swing radius of the wheel. However, such extra structures have been comparatively complex and costly.

SUMMARY OF THE INVENTION

The present invention recognizes that, by using constant velocity universal joints as wheel suspension members carrying thrust loads in addition to carrying driving torque, such constant velocity universal joints can be suitably positioned with respect to the wheel assembly and the differential so as to increase the effective swing radius of the wheel. The present invention further recognizes that, by serving as a suspension member carrying some of the axial thrust loads, the inboard constant velocity joint can also be used to effect greater articulation angles allowing the joint to be offset from the wheel rotation axis in a manner increasing the swing radius of the wheel.

In accordance with the present invention, the inboard constant velocity universal joint is mounted in the differential along a lateral side of the differential housing so as to define a wheel axis offset angle of at least five degrees between the wheel output axis of the wheel and the differential output axis of the differential. The inboard constant velocity universal joint is also positioned relative to the input axis of the differential so as to have an offset therefrom on the order of a distance about equal to the outer diameter of the outer joint member of the inboard constant velocity universal joint.

This invention further recognizes that, once constant velocity universal joints are used as suspension members, the wheel-to-drive axis offset angle between the wheel axis of the wheel and the drive axis of the constant velocity universal joint may be advantageously combined with the angle between the drive axis and the swing axis so as to minimize the camber of the wheel and to reduce the angle that the swing axis makes with the wheel axis to less than thirty degrees.

In accordance with the present invention, the inboard constant velocity universal joint is mounted within each lateral side of the differential housing on opposite sides of a differential which has an input axis therethrough. The inboard joint articulation axis of each inboard constant velocity universal joint is spaced from the differential input axis by a distance equal to about the diameter of the outer joint member. The joint articulation or drive axis is also longitudinally offset from the wheel output axis by an amount causing the drive axis and the wheel output axis to establish an angle of at least five degrees therebetween. The outboard constant velocity universal joint is positioned within each wheel assembly such that its outboard joint articulation axis is either at or outboard of the wheel center plane of each wheel. The inboard articulation axis also includes a pivot axis locating a swing axis therethrough, the other pivot axis being established by an arm coupling the wheel assembly to the vehicle frame. In this manner, the inboard constant velocity universal joint serves as one of two pivot axes establishing a swing axis for the independent wheel suspension system. The various joint offsets are selected and cooperate to establish the angle between the swing axis and the wheel output axis at less than thirty degrees, to thereby minimize the camber as the wheel swings about the swing axis.

It is, therefore, a primary object of the present invention to provide a new and improved independent wheel suspension system.

It is another primary object of the present invention to provide an independent wheel suspension system using constant velocity universal joints as suspension members carrying axial thrust loads and positioning such constant velocity universal joints so as to effect an angle of less than thirty degrees between the swing axis of the suspension system and the wheel output axis of the independent wheel suspension system.

It is a further object of the present invention to provide an independent wheel suspension system of the foregoing type, wherein the angle between the wheel output axis and the drive axis combines with the angle between the drive axis and the swing axis to establish the angle between the swing axis and the wheel output axis at less than thirty degrees.

It is a further object of the present invention to provide an independent wheel suspension system of the foregoing type, wherein the inboard constant velocity universal joint is so positioned relative to the wheel output axis so as to establish an angle of more than five degrees between the drive axis and the wheel output axis.

It is a further object of the present invention to provide an independent wheel suspension system of the foregoing type, wherein each inboard constant velocity universal joint has an outer member with an outer diameter and the inboard joint axis is offset from the differential input axis by a distance substantially equal to the outer diameter of the outer joint member.

BRIEF DESCRIPTION OF THE DRAWINGS

These and other features and objects of the present invention will become more apparent to those skilled in the art from the following description of a preferred embodiment of the invention and claims, taken in conjunction with the appended drawings wherein:

DETAILED DESCRIPTION OF THE PREFERRED EMBODIMENT

Figure 1:
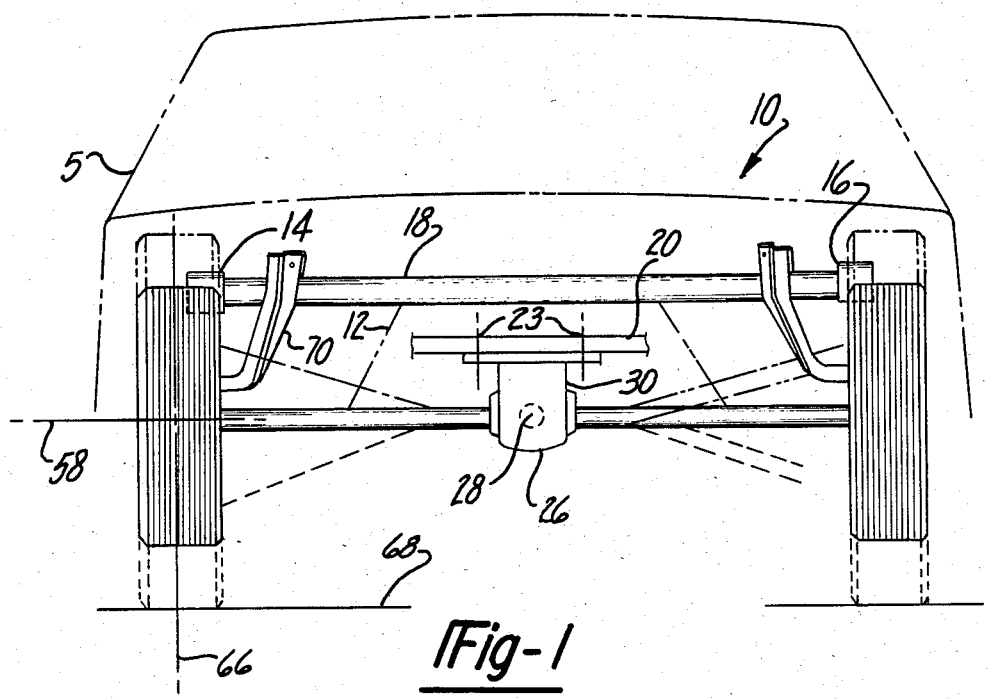
FIG. 1 is a schematic view of an independent wheel suspension system including at least two suspension parts, the first part of which includes constant velocity universal joints at both the inboard and outboard ends of a drive shaft connecting the differential to the wheels and the second part of which includes a swing arm coupling the wheel assembly to the vehicle frame.
Figure 3:
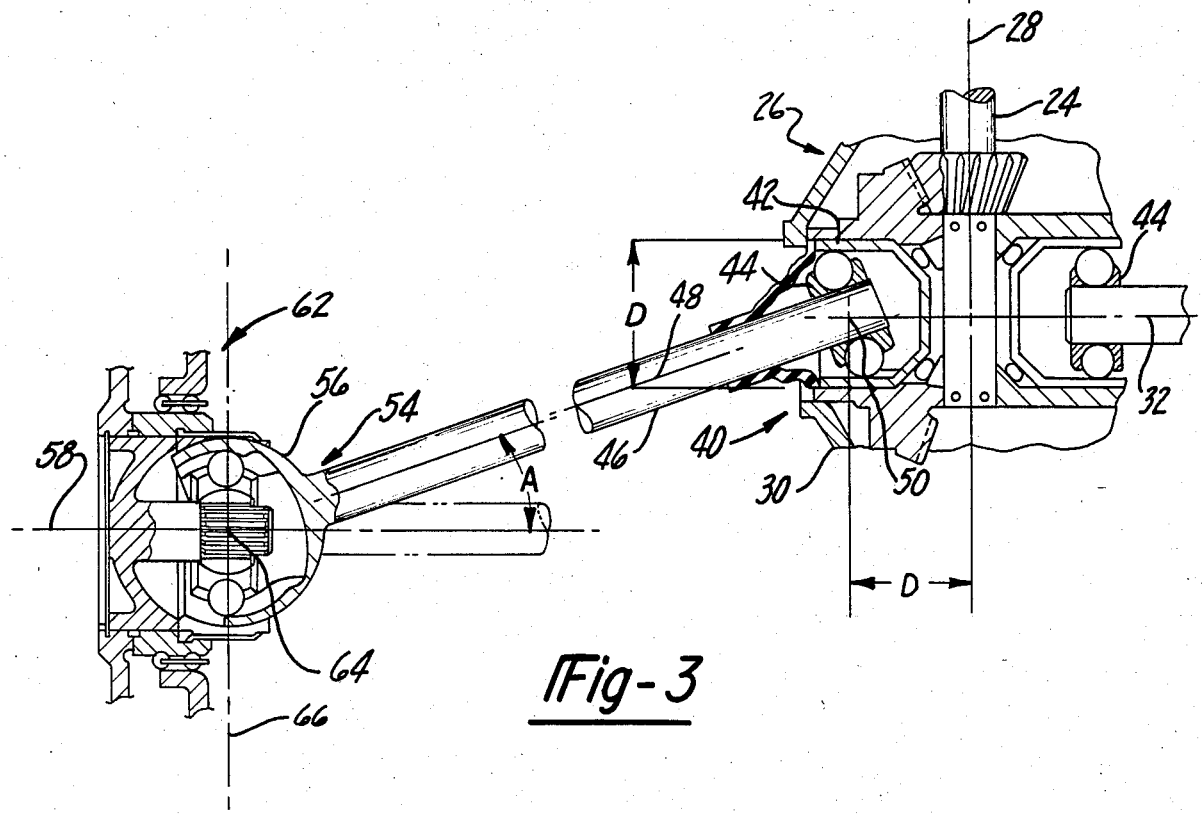
FIG. 3 is a partial top view, partially in cross-section, showing a fixed conventional constant velocity universal joint as the outboard joint and a plunging constant velocity universal joint mounted within the differential suitable for use in the independent wheel suspension system.
Figure 2:
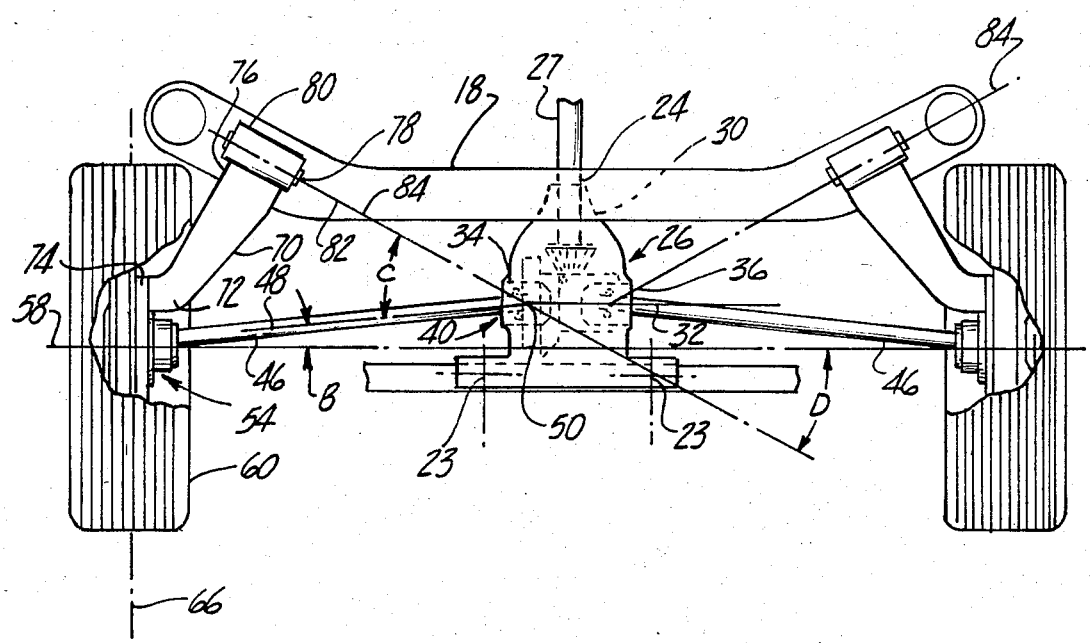
FIG. 2 is a plan view of the independent wheel suspension system provided in accordance with the present invention.

Referring now to the drawings, there is shown in FIGS. 1 through 3 a four-wheeled motor vehicle which includes a body 5 mounted to a chassis 10 and supported in a known manner, such as by springs or shock absorbers 12, with respect to a vehicle support means in the form of a vehicle frame consisting of a first longitudinal frame member 14 and a second longitudinal frame member 16, and at least two transverse support members 18 and 20 spaced therebetween and suitably affixed thereto in a known manner. Chassis and/or chassis support means, as used herein, are intended to include a vehicle made of unitary construction wherein some of the chassis components are provided in the body of the vehicle. The vehicle also includes an engine (not shown) adapted to provide a driving torque to one end of a prop shaft 27, the other end of which is coupled to a differential input 24 of a differential 26.

The differential 26 has a differential input axis 28 therethrough about which the prop shaft 27 applies the driving torque developed by the engine. The differential 26 also includes a differential housing 30 which is attached to one of the transverse support members 20 in a known manner, such as by bolts 23, and rotatably supports a differential gear set, as partially shown in FIG. 3, which translates the torque from the longitudinal differential input axis 28 to the transversely positioned differential output axis 32 substantially perpendicular to the differential input axis 28 and extending transversely through the opposite lateral sides 34 and 36 of the differential housing 30.

Suitably secured within the differential housing 30 is an inboard constant velocity universal joint 40 having an outer joint member 42 coupled to a respective gear for rotation about the differential output axis 32. The inboard constant velocity universal joint 40 also includes an inner joint member 44 connected to the inboard end of a drive shaft 46 for rotation about a drive axis 48 and adapted to permit angular articulation through an articulation angle A between the differential output axis 32 and the drive axis 48 about an inner joint articulation point 50 along the homokinetic plane of the joint. The inner joint articulation point 50 is located in a longitudinal plane offset from the differential input axis 28 by a distance D equal to the outer diameter D of the outer joint member 42.

The outboard end of the drive shaft 46 is connected to an outer joint member 56 of an outboard constant velocity universal joint 54. The outer joint member 56 is coupled to rotate about a wheel output axis 58 of a wheel 60 of a wheel assembly 62. The inboard constant velocity universal joint 40, drive shaft 46, and outboard constant velocity universal joint 54 establish a suspension member carrying the axial thrust loads and coupling the driving torque developed by the engine from the differential 26 to the wheel assembly 62. The outboard constant velocity universal joint 54 permits an articulation through the articulation angle A between the drive axis 48 and the wheel output axis 58 about an outboard joint articulation point 64 along the homokinetic plane of the joint located either in the longitudinal center plane 66 through the middle of the wheel 60, as viewed from the front or rear of the vehicle, or at an offset therefrom towards the outboard side of the wheel 60, as viewed along a driving surface 68. In this manner, the length of a suspension swing arm 70 between the inboard joint articulation point 50 and the outboard joint articulation point 64 is maximized for the purpose of minimizing the change in camber of the wheel 60 as it swings out of its center plane 66 relative to the inboard constant velocity universal joint 40.

One of the inboard and the outboard constant velocity universal joints 40 and 54 preferably are of the fixed or non-axial movement type, shown as the outboard joint in greater detail in FIG. 2. However, in certain applications, one or both of these constant velocity universal joints may also be of the axial plunging type, shown as the inboard joint in FIG. 2, telescoping, or splined types, such as those shown in U.S. Pat. No. 3,688,521, to Smith, et al., issued Sep. 5, 1972, the specification of which is hereby incorporated herein by reference, as long as such types, at either end of their axial travel, function as a suspension member of the independent wheel suspension system in the same manner as a fixed constant velocity universal joint. Moreover, some applications may require that only the inboard joint be of the constant velocity universal type, the outboard coupling being of another type, universal or otherwise.

The wheel assembly 62 is pivotably coupled to the other transverse support member 18 by a swing arm 70 having a wheel end 72 pivotably connected to a pivot pin or knuckle 74, which is shown schematically because it is known in the art, the pivot pin or knuckle 74 being mounted to the wheel assembly 62 and further including a frame end 76 pivotably connected to a pivot pin 78 supported by a bracket 80 secured to the transverse member. The pivot pin 78 has its pivot axis 82 coaxial with a swing axis 84 intersecting the inboard joint articulation point 50. The inboard constant velocity universal joint 40 and the pivot pin 78 provide the only two bearing points establishing the swing axis 84.

The inboard constant velocity universal joint 40 is positioned at a wheel axis offset along the differential input axis 28 from the wheel output axis 58 so as to establish a drive-to-wheel axis offset angle B of at least five degrees between the drive axis and the wheel output axis 58. The pivot pin 78 is positioned on the swing arm 70 so that the swing axis 84 establishes a swing-to-drive axis offset angle C of less than thirty-four degrees between the drive axis 48 and the swing axis 84. The combination of the drive-to-wheel offset angle B with the drive-to-swing axis offset angle C establishes a swing-to-wheel axis offset angle D of twenty-nine degrees. At twenty-nine degrees, the swing-to-wheel axis offset angle minimizes changes in camber of the wheel 60 from the longitudinal center plane 66 as the wheel 60 moves between up and down positions with respect to the swing axis so as to afford improved driving, handling and steering characteristics.

Those skilled in the art will recognize that the vehicle suspension system described herein may also include various combinations of helical springs, leaf springs, shock absorbers and other well known dampening suspension devices.

Although the best mode contemplated for carrying out the present invention as of the filing date hereof has been shown and described herein, it will be apparent to those skilled in the art that suitable modifications, variations, and equivalents may be made without departing from what is regarded as the scope of the invention, the invention being limited only by the term of the following claims:

What is claimed is:

1. An independent wheel suspension system for a vehicle having an engine adapted to provide a driving torque, a chassis, vehicle support means for resiliently supporting said chassis for displacement relative to a driving surface, and a wheel assembly for each wheel having a vertical center plane through the center thereof and a wheel axis substantially perpendicular to said vertical center plane, said wheel assembly having a camber angle relative to said vertical center plane adapted to undergo a change of chamber as said wheel assembly undergoes movement relative to said vertical center plane, said independent wheel suspension system comprising:

differential means comprising a differential housing, a differential input at an engine end of said differential housing adapted to be coupled to said engine so as to receive said driving torque therefrom about a differential input axis, said differential housing having a pair of lateral sides on opposite sides of said differential input axis, each said lateral side having a differential output axis therethrough, said differential means being adapted to redirect said driving torque from said differential input axis to said differential output axis and being supported by said vehicle support means to position said differential input axis substantially perpendicular to said wheel axis;

an inboard constant velocity universal joint connected within each lateral side of said differential housing and having an outer joint member rotatable about said differential output axis, an outboard constant velocity universal joint connected to each said wheel assembly and having a joint member rotatable about said wheel axis, and a drive shaft coupling said inboard constant velocity universal joint and said outboard constant velocity universal joint adapted to translate torque therebetween along a drive axis and coupling both the lateral thrust load and a driving torque, said inboard and said outboard constant velocity universal joints each having a respective inboard and outboard joint articulation point intersected by said drive axis and, respectively, by said differential output axis and said wheel axis, said inboard and said outboard joint articulation points establishing a swing arm length therebetween, said inboard joint articulation point being located along said differential output axis at an inboard joint offset from said differential input axis and establishing a first pivot bearing, and said outboard joint artiuclatio point being located in a predetermined position along said wheel axis at an outboard joint offset relative to said vertical center plane; and arm means coupling said wheel assembly and said chassis to define a swing axis and having arm pivot means establishing a second pivot bearing for said swing axis therethrough, said arm pivot means adapted to allow a movement of said wheel assembly relative to said vehicle support means about said swing axis, and said arm pivot means being located on said vehicle support means so that said swing axis and said drive axis establish a predetermined drive-to-swing axis angle therebetween and so that said swing axis and said wheel axis establish a predetermined wheel-to-swing axis offset angle therebetween;

whereby, said swing arm length is maximized thereby minimizing the change of camber so as to produce predetermined vehicle driving, steering, and handling characteristics.

2. An independent wheel suspension system for a vehicle having an engine adapted to provide a driving torque, a chassis, vehicle support means for resiliently supporting said chassis for displacement relative to a driving surface, and a wheel assembly for each wheel having a vertical center plane through the center thereof and a wheel axis substantially perpendicular to said vertical center plane, said wheel assembly having a camber angle relative to said vertical center plane adapted to undergo a change of camber as said wheel assembly undergoes movement relative to said vertical center plane, said independent wheel suspension system comprising:

differential means comprising a differential housing, a differential input at an engine end of said differential housing adapted to be coupled to said engine so as to receive said driving torque therefrom about a differential input axis, said differential housing having a pair of lateral sides on opposite sides of said differential input axis, each said lateral side having a differential output axis therethrough, said differential means being adapted to redirect said driving torque from said differential input axis to said differential output axis and being supported by said vehicle support means to position said differential input axis substantially perpendicular to said wheel axis;

an inboard constant velocity universal joint connected within each lateral side of said differential housing and having an outer joint member rotatable about said differential output axis, an outboard constant velocity universal joint connected to each said wheel assembly and having a joint member rotatable about said wheel axis, and a drive shaft coupling said inboard constant velocity universal joint and said outboard constant velocity universal joint adapted to translate torque therebetween along a drive axis and coupling both the lateral thrust load and a driving torque, said wheel and differential housing being located with respect to said chassis to establish a predetermined drive-to-wheel axis offset angle, said inboard and said outboard constant velocity universal joints each having a respective inboard and outboard joint articulation point intersected by said drive axis and, respectively, by said differential output axis and said wheel axis, said inboard and said outboard joint ariticulation points establishing a swing arm length therebetween, said inboard joint articulation point being located along said differential output axis at an inboard joint offset from said differential input axis and establishing a first pivot bearing, and said outboard joint articulation point being located in a predetermined position along said wheel axis at an outboard joint offset relative to said vertical center plane; and arm means coupling said wheel assembly and said chassis to define a swing axis and having arm pivot means establishing a second pivot bearing for said swing axis therethrough, said arm pivot means adapted to allow a movement of said wheel assembly relative to said vehicle support means about said swing axis, and said arm pivot means being located on said vehicle support means so that said swing axis and said drive axis establish a predetermined drive-to-swing axis angle therebetween and so that said swing axis and said wheel axis establish a predetermined wheel-to-swing axis offset angle therebetween;

whereby, said swing arm length is maximized thereby minimizing the change of camber so as to produce predetermined vehicle driving, steering, and handling characteristics, said predetermined vehicle driving, steering, and handling characteristics being produced by the cooperation of at least two factors selected from the group that includes said predetermined wheel-to-swing axis offset angle, said predetermined drive-to-wheel offset angle, said predetermined drive-to-swing axis offset angle, an offset between said wheel axis and said inboard joint offset, said outboard joint offset, and the position of said pivot arm.

3. The independent wheel suspension system of claim 2, wherein said predetermined swing-to-drive axis angle cooperates with said predetermined drive-to-wheel axis offset angle to establish said predetermined swing-to-drive axis offset angle at less than thirty degrees.

4. The independent wheel suspension system of claim 3, wherein said at least two factors comprise said predetermined drive-to-wheel axis offset angle and said predetermined wheel-to-swing offset angle and wherein said predetermined drive-to-wheel axis offset angle is at least five degrees and said predetermined wheel-to-swing axis offset angle is less than thirty degrees.

5. The independent wheel suspension system of claim 2, wherein said at least two factors comprise said outboard joint offset and said inboard joint offset and wherein said outboard joint offset establishes said vertical center plane interposed said outboard joint articulation axis and said inboard joint articulation axis.

6. The independent wheel suspension system of claim 2, wherein said at least two factors comprise said inboard and said outboard offsets and wherein said outer joint member of said inboard constant velocity universal joint has an outer diameter approximating said inboard joint offset.

7. The independent wheel suspension system of claim 2, wherein said at least two factors comprise said inboard and said outboard joint offsets and wherein said at least two factors cooperate with said wheel offset of said inboard articulation axis to establish said predetermined drive-to-wheel offset angle at greater than five degrees.

* * * * *

UNITED STATES PATENT AND TRADEMARK OFFICE
CERTIFICATE OF CORRECTION

PATENT NO. : 4,632,203

DATED : Dec. 30, 1986

INVENTOR(S) : Werner Krude

It is certified that error appears in the above-identified patent and that said Letters Patent is hereby corrected as shown below:

Column 2, line 10, after "approach" insert ---- , ----.

Column 2, line 28, delete "impose" and insert ---- imposing ----.

Column 5, line 52, after "or" insert ---- a ----.

Column 7, line 36, delete "term" and insert ---- terms ----.

Column 7, line 48, delete "chamber" and insert ---- camber ----.

Column 8, line 20, delete "articulatio" and insert ---- articulation ----.

Column 10, line 11, after "arm" insert ---- means ----.

Column 10, line 16, delete "drlve" and insert ---- drive ---.

Signed and Sealed this

Twentieth Day of October, 1987

Attest:

DONALD J. QUIGG

Attesting Officer

Commissioner of Patents and Trademarks